March 15, 1927.  C. H. DICKEY  1,621,356

DUST PREVENTING DEVICE FOR REAR PLATFORMS OF VEHICLES

Filed Aug. 21, 1926  2 Sheets-Sheet 1

INVENTOR
Cephus H. Dickey.
BY
ATTORNEY

March 15, 1927.
C. H. DICKEY
1,621,356
DUST PREVENTING DEVICE FOR REAR PLATFORMS OF VEHICLES
Filed Aug. 21, 1926    2 Sheets-Sheet 2
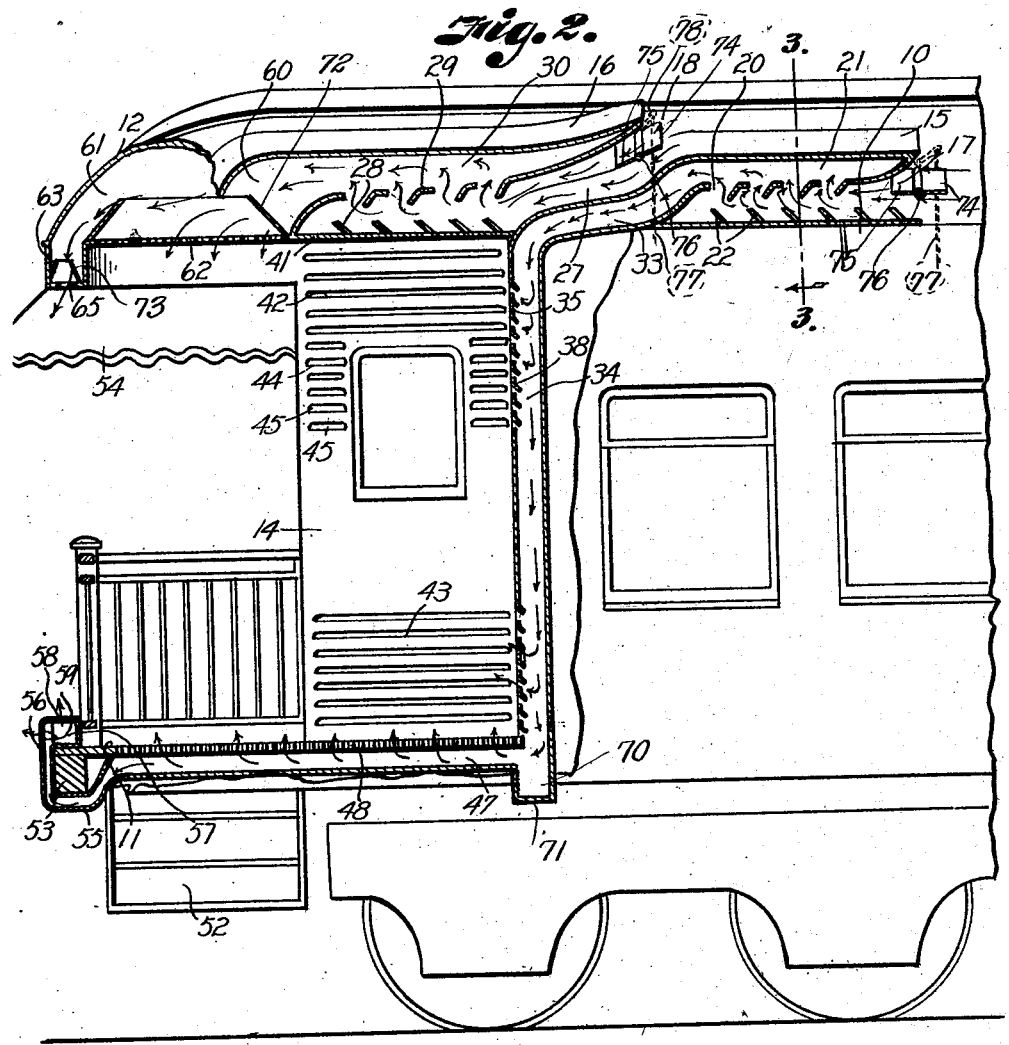
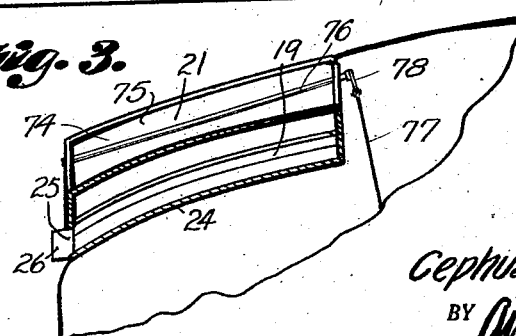
INVENTOR
Cephus H. Dickey.
BY
ATTORNEY Patented Mar. 15, 1927.

1,621,356

UNITED STATES PATENT OFFICE.

CEPHUS H. DICKEY, OF KANSAS CITY, KANSAS.

DUST-PREVENTING DEVICE FOR REAR PLATFORMS OF VEHICLES.

Application filed August 21, 1926. Serial No. 130,653.

My invention relates to dust preventing means for rear platforms of vehicles and more particularly to dust preventing means for the observation platform of a vehicle such as a railway car.

The dust that accumulates on the rear platform of a vehicle such as the observation car of a railway train is drawn up from the road bed by suction created due to the rapid movement of the vehicle through the air, this creating a vacuum in back of the vehicle or train of vehicles and the inrush of air into such vacuum causes dust and the like to be sucked up from the road bed and ground adjoining the road bed into the space at the rear of the vehicle and into the space between the roof and floor of the observation platform. The air enters, of course, to a certain extent from all sides but the air that carries the dust mainly comes from below the level of the platform.

If no vacuum existed on the rear platform of the vehicle there would obviously be no suction created which would cause the dust to be carried onto said platform and into the space between the floor and the roof. It is accordingly a purpose of my invention to supply air to such space and in such a manner and such quantity that no vacuum will exist in the space above the platform and below the roof at the rear of the vehicle. In order to accomplish this purpose it is necessary to distribute the air that is to be supplied over a wide area about the platform, preferably the air being supplied through the floor, through the ceiling, through the usual projecting side wall portions at opposite sides of the platform, through the rear wall portion of the car adjacent the platform and at the rear edge portion of the platform both near the floor and near the roof. Any means operating either due to the movement of the train or otherwise may be utilized for supplying the air to the outlets located at various points in the space under the roof and above the rear platform. In the form of the invention shown, the air is supplied by suitable collecting devices located adjacent the roof of the car and conducted from these devices to the outlets through suitable ducts. The number of collecting devices and the size thereof can be so proportioned as to take care of the necessary number of outlets for any platform and accordingly the amount of air supplied will be in proportion to the speed of the railway cars of a train or other vehicle, supplying a small amount of air when there is little or no suction at slow speed and supplying a large amount of air when there is greater suction at higher speed.

It is a further purpose of my invention to provide for the distribution of air in the space between the roof and floor of the rear platform in such a manner that no violent currents of air will be thrown onto said platform and furthermore to prevent the carrying of cinders or water onto the rear platform. In order to prevent this, suitable cinder and water traps are provided, which have deflecting means against which the cinders or water will strike and will drop into a position out of the path of the current of air passing through such traps. Furthermore the outlets are preferably provided with deflecting devices which will separate the cinders from the current of air.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 2 is a view partly in elevation and partly in longitudinal section thereof.

Fig. 3 is a fragmentary section taken on the line 3—3 of Fig. 2, and

Figure 1:
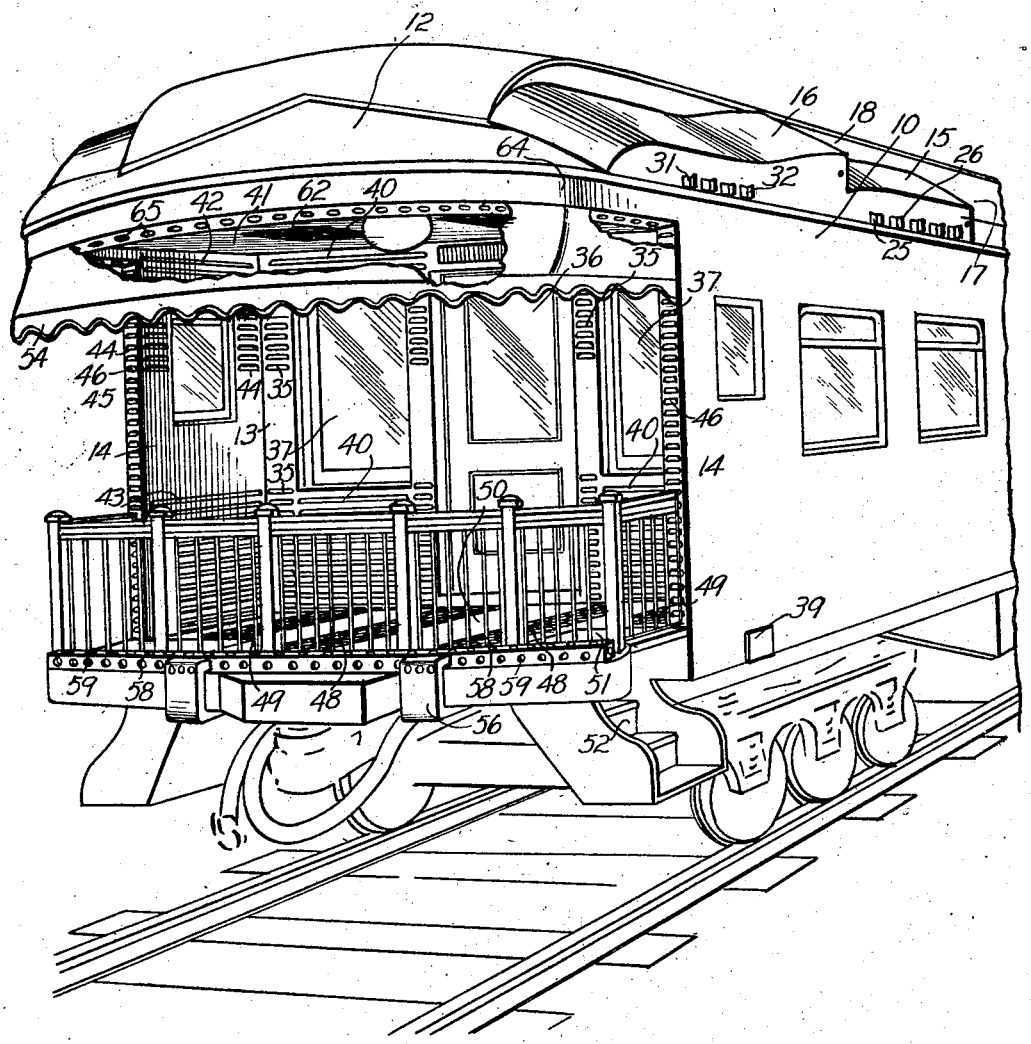
Fig. 1 is a fragmentary perspective view partly broken away of a railway observation car as viewed from the rear end thereof, showing my improved dust preventing means applied thereto.

Referring in detail to the drawings:

In Figs. 1 and 2 is shown a railway car 10 having an open rear or observation platform that has the usual floor 11 with the car roof 12 projecting beyond the end wall 13 of the car body and overlying the floor 11 of said rear platform. The side walls of the car usually have the extensions 14 lying on opposite sides of the platform and forming a partial enclosure therefor extending rearwardly from the rear wall 13.

My improved air collecting and distributing means preferably comprises a pair of inlets 15 and 16 located on the roof 12 adjacent the rear end of the car 10 or at any other desired point along said roof at each side thereof, it being of course obvious that while two such inlets are shown, the requisite number to obtain the desired volume of air may be varied in accordance with the volume of air required. In the drawings the inlet opening 17 of the member 15 is shown as lying below the inlet opening 18 of the member 16 to thus stagger such openings whereby the air will have a more ready access to the rear one of the two openings. While the system of conduits is shown as being divided into several parts connected with individual inlets, it is obvious that this is not necessary, any arrangement of conduits for conducting the air from any desired number of inlets to any desired number of outlets being capable of use in connection with the invention. In the arrangement shown, however, the collecting member 15 has a passage 19 leading from the opening 17 through a plurality of openings 20 into the passage 21. The passage 19 has a plurality of obliquely extending inclined fins 22 projecting upwardly from the bottom wall thereof and similar staggered obliquely extending fins 23 extending downwardly from the dividing wall between the passage 21 and the passage 19. The fins 22 and 23 act as cinder and water deflectors, the air passing in a circuitous path around the fins, causing the cinders or water to strike against the fins and travel downwardly along the same. The bottom wall 24 of the passage 19 inclines toward the outlets 25 adjacent the side walls of the car through which the cinders and water are adapted to be discharged, suitable air deflecting fins 26 being provided on the forward sides of the openings 25 to prevent a current of air due to the forward travel of the car 10 from rushing in through the openings 25 and driving the cinders or water backwardly from said openings. The member 16 is similarly constructed, having a passage 27 leading from the opening 18 and having the deflector members 28 and 29 therein corresponding to the members 22 and 23, said passage 27 leading to the passage 30 as will be clear from Fig. 2, the cinders and water being discharged through the openings 31 which are provided with the deflecting members 32. Thus the portions of the passages 19 and 27 having the deflector members therein serve as cinder and water traps and deflect substantially all the cinders and rainwater from the stream of air passing in through the inlets or collecting members 15 and 16.

Figure 4:
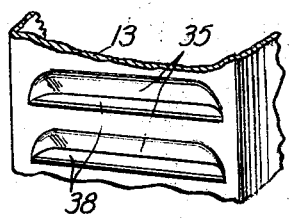
Fig. 4 is a fragmentary perspective view of a wall portion of the car, showing the outlets for the air.

From the inlets 15 suitable ducts such as the duct 33 lead downwardly from the passage 21 to suitable ducts such as the duct 34 in the side walls 14 and the end wall 13 to the openings 35 in the end wall between the door 36 and the windows 37 and between the windows 37 and the side walls 14. Said openings 35 may be provided in the end wall itself or in a suitable false wall member overlying the rear wall. While any arrangement of the openings 35 may be utilized that is found to be desirable, it is preferred that these openings be arranged adjacent the upper portion of the wall 13 and adjacent the lower portion thereof as shown in Fig. 1. The openings 35 are preferably in the form of slots as more clearly shown in Fig. 4, made in the wall portion 13, the material cut out of the wall to form the slots being left secured along one edge thereof and turned inwardly to form the downwardly inclined deflector plates 38 which project into the duct 34 and cause the current of air to turn at an acute angle to thus separate any cinders that may still be in the current of air therefrom, causing the same to drop to the bottom of the duct and into the transverse duct 70 having a bottom 71 from which the same may be removed, a removable plate 39 being shown in the side wall 13 for removal of the cinders collecting at the bottom 71 of the duct 70. Preferably suitable outlets which may be in the form of elongated slots 40 similar to the slots 35 are provided above and below the windows 37 in the rear wall 13 to thus obtain a supply of air at said rear wall near the ceiling 41. The side walls 14 preferably have the elongated slots 42 and 43 therein which are similar to the slots 40, it being, of course, understood that such slots 40, 42 and 43 have deflector members similar to the deflector members 38. The side wall portions 14 are further provided with shorter slots 44 at opposite sides of the windows 45. Thus inwardly flowing streams of air are provided that flow toward the center of the space between the floor and ceiling of the rear platform from opposite sides of the platform. Furthermore, to prevent the inrush of air from the side of the car which may bring dust and cinders with the same and to supply air at the sides of the platform at vertically spaced points to thus prevent the formation of a vacuum and the resultant suction at these points, the openings or slots 46 are provided which are distributed along the rear edge portions of the walls 14 and are arranged in a row extending substantially from the top to the bottom of said edge.

The vertically extending conduits or ducts such as the duct 34 are provided with horizontal extensions 47 leading from the transverse duct 70 above the bottom 71 thereof which extend under the floor 11 and lead to the perforated plates 48 and 49 which may be made in a similar manner to the ordinary warm air registers used in heating systems and are located in the floor 11, thus supplying an upward current of air at the points at which such perforated members 48 and 49 are located. The members 48 and 49 are made of such a length and of such width as to avoid the structural members associated with the draft rigging located under the central portion of the floor 50 and to avoid the trap doors 51 provided at the walls from which the steps 52 descend, the arrangement of outlets being preferably such as to avoid any alteration in the structural features of the car or the rear plaftorm thereof, the outlets being only so arranged as to obtain a substantially equal distribution of air at all points in the space under the roof and above the floor of the rear platform and to prevent the inrush of air around the edges of the walls 14, the end sill 53 and the canopy 54 extending downwardly from the rear and side edges of the roof 12.

In order to supply the proper amount of air at the rear edge portion of the floor 11 the duct 47 is provided with an extension around the end sill 53 having a downwardly deflected portion 55 and an upwardly extending portion 56 extending around said end sill leading to a transversely extending duct 57 which has rows of openings 58 in the upper face thereof and rows of openings 59 in the rear face thereof. Thus there will be an equal distribution of air over the entire rear edge portion of the platform, the stream of air from the openings 58 going upwardly to supply air to the space above the floor 11 at the rear end thereof and the current of air from the openings 59 flowing rearwardly so as to supply air to the space immediately back of the platform that is clean instead of the dust laden air from the road bed. There are no deflectors provided on the perforated members 48 or the openings 58 and 59 as the location thereof together with the offsets in the conduits will make it unnecessary to provide such deflecting means, the cinders dropping toward the bottom of the conduits from which the same may be cleaned out whenever necessary.

From the inlets 16 the passages 30 lead to suitable ducts 60 and 61 located in the roof 12 and leading to the perforated plates 62 in the ceiling 11 which are in the form of members similar to the warm air registers used in heating systems, suitable oblique deflector members 72 for rain water and cinders being provided around said perforated plates 62, and to the duct 63 which is located in the depending wall portion 64 extending around the rear edge and side edge of the roof adjacent the rear end thereof as will be evident from Fig. 1. Openings 65 are distributed substantially evenly along the bottom wall of the duct 63 from which the air will be discharged to distribute the same in the space below the canopy 54, thus supplying air to the space above the rear platform and under the roof and preventing the too rapid discharge of said air rearwardly of the platform, a certain amount thereof, of course, going around the lower edge of the canopy 54 and flowing rearwardly and downwardly and co-operating with the air from the openings 58 and 59 to prevent a forward rush of dust laden air from the rear open end of the platform. The openings 65 are also preferably provided with obliquely extending cinder and water deflecting members 73.

In order to regulate the supply of air entering through the inlets 15 and 16 the openings 17 and 18 thereof are preferably provided with adjustable shutters and valve members 74 having the wings 75 extending from the central pivot members or shafts 76. The members 74 may be moved to any desired angular position by means of any suitable operating devices such as the flexible members 77 mounted on the cranks 78. Said flexible members extend into the interior of the car to suitable points where the same are readily accessible for operation thereof.

What I claim and desire to secure by Letters Patent is:—

1. The combination with a vehicle body having a rear platform, of means for supplying air to said platform at the end thereof adjacent the vehicle body and adjacent the end thereof remote from said vehicle body.

2. The combination with a vehicle body having a rear platform, of means for supplying air to said platform at the end thereof adjacent the vehicle body, adjacent the end thereof remote from said vehicle body and at the sides of said platform.

3. The combination with a vehicle body having a rear platform, of means for supplying air to said platform at the end thereof adjacent the vehicle body, and at the sides of said platform.

4. The combination with a vehicle body having a rear platform and having a roof thereover, of means for supplying air to said platform under said roof.

5. The combination with a vehicle body having a rear platform and having a roof thereover, of means for supplying air to said platform under said roof at a plurality of spaced points.

6. The combination with a vehicle body having a rear platform and having a roof thereover, of means for supplying air to said platform under said roof at a plurality of points spaced both longitudinally and transversely of said platform.

7. The combination with a vehicle body having a rear platform and having a roof thereover, of means for supplying air to said platform under said roof at a plurality of points spaced vertically, longitudinally and transversely of said platform.

8. The combination with a vehicle body having a rear platform and a roof extending over said rear platform from said body, of air ducts having air discharge outlets adjacent the rear end of said platform both adjacent said floor and adjacent said roof, and means for creating a current of air through said ducts.

9. The combination with a vehicle body having a rear platform and a roof extending over said rear platform from said body, of air ducts having air discharge outlets adjacent the rear end of said platform both adjacent said floor and adjacent, but under, said roof, and means for creating a current of air through said ducts.

10. The combination with a vehicle body having a rear platform, of ducts having air discharge outlets directing streams of air inwardly toward the center of said platform and means for creating a current of air through said ducts.

11. The combination with a vehicle body having a rear platform of ducts having air discharge outlets at the sides thereof directing streams of air inwardly toward the center of said platform and means for creating a current of air through said ducts.

12. The combination with a vehicle body having a rear platform and a roof extending over said rear platform from said body, of air ducts having air discharge outlets adjacent the rear end of said platform and adjacent the rear end of said body under said roof, and means for creating a current of air through said ducts.

13. The combination with a vehicle body having a rear platform and a roof, of means for collecting air adjacent said roof and conducting the same to a plurality of points on said rear platform.

14. The combination with a vehicle body having a rear platform and a roof, of means for collecting air adjacent said roof and conducting the same to a plurality of points on said rear platform under said roof.

15. The combination with a vehicle body having a rear platform and a roof having a portion extending over said platform, of means for collecting air adjacent said roof and conducting the same to a plurality of discharge openings about said platform under said roof, at a plurality of spaced points.

16. The combination with a vehicle body having a rear platform and a roof having a portion extending over said platform, of means for collecting air adjacent said roof and conducting the same to a plurality of discharge openings about said platform under said roof, at a plurality of points spaced both longitudinally and transversely of said platform.

17. The combination with a vehicle body having a rear platform and a roof having a portion extending over said platform, of means for collecting air adjacent said roof and conducting the same to a plurality of discharge openings about said platform under said roof, at a plurality of spaced points, and cinder and water separating devices in said means.

18. In combination with a vehicle body having a rear platform and a roof having a portion extending over said platform, of means for collecting air adjacent said roof and conducting the same to a plurality of discharge openings about said platform under said roof, at a plurality of spaced points, and cinder traps in said means adjacent said roof.

19. The combination with a vehicle body having a rear platform and a roof having a portion extending over said platform, of means for collecting air adjacent said roof and conducting the same to a plurality of discharge openings about said platform under said roof, at a plurality of spaced points, and cinder traps in said means having oblique cinder deflecting members therein.

20. The combination with a vehicle body having a rear platform and a roof having a portion extending over said platform, of means for collecting air adjacent said roof and conducting the same to a plurality of discharge openings about said platform under said roof, at a plurality of spaced points, and deflectors in said means comprising obliquely extending fins and having discharge outlets adjacent the bottom thereof.

In testimony whereof I affix my signature.

CEPHUS H. DICKEY.